(12) United States Patent
Ponthieu et al.

(10) Patent No.: US 12,017,536 B2
(45) Date of Patent: Jun. 25, 2024

(54) ASSEMBLY PART FOR CONNECTING A DASHBOARD TO A BODY PART OF A VEHICLE

(71) Applicant: FAURECIA INTERIEUR INDUSTRIE, Nanterre (FR)

(72) Inventors: Didier Ponthieu, La Neuville St Pierre (FR); Patrick Dossou, Paris (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 138 days.

(21) Appl. No.: 17/764,072

(22) PCT Filed: Sep. 16, 2020

(86) PCT No.: PCT/FR2020/051600
§ 371 (c)(1),
(2) Date: Mar. 25, 2022

(87) PCT Pub. No.: WO2021/058894
PCT Pub. Date: Apr. 1, 2021

(65) Prior Publication Data
US 2022/0355666 A1 Nov. 10, 2022

(30) Foreign Application Priority Data
Sep. 25, 2019 (FR) ..................... 19 10587

(51) Int. Cl.
*B62D 25/14* (2006.01)
*B60K 37/00* (2006.01)
*B60K 37/10* (2024.01)

(52) U.S. Cl.
CPC .............. *B60K 37/00* (2013.01); *B62D 25/14* (2013.01); *B60K 37/10* (2024.01)

(58) Field of Classification Search
CPC .. F16B 5/06; F16B 21/08; F16B 5/065; B60R 13/04; B62D 65/14; B60K 2370/87; B60K 37/00; B60K 35/00
(Continued)

(56) References Cited

U.S. PATENT DOCUMENTS 5,620,329 A * 4/1997 Kidd .................. H01R 13/6315
439/378
5,845,931 A * 12/1998 Nagy .................. B60R 21/2165
280/732
(Continued)

FOREIGN PATENT DOCUMENTS

EP 3267047 A1 * 1/2018 ........... B61D 17/043
EP 4060136 A1 * 9/2022
JP 5878140 B2 * 3/2016

OTHER PUBLICATIONS

International Search Report with English translation corresponding to International Application No. PCT/FR2020/051600, dated Dec. 8, 2020, 5 pages.
(Continued)

*Primary Examiner* — Joseph D. Pape
(74) *Attorney, Agent, or Firm* — Reising Ethington P.C.

(57) ABSTRACT

The invention relates to an assembly part for connecting a dashboard to a body part of a vehicle, the assembly part comprising:
 a male first portion able to engage with the dashboard, and
 a female second portion able to engage with the body part of the vehicle via a unidirectional and adjustable approaching movement,
 the male portion being substantially flat and extending in a longitudinal direction from a first end in contact with the female portion to a hook-shaped free second end,
 the male portion and/or the female portion being configured to prevent translational movement between the
(Continued)

dashboard and the body part when the male portion is engaged with the dashboard and the female portion is engaged with the body part.

18 Claims, 4 Drawing Sheets

(58) Field of Classification Search
USPC .................................................. 296/70, 72
See application file for complete search history.

(56) References Cited

U.S. PATENT DOCUMENTS

| | | | | |
|---|---|---|---|---|
| 6,101,686 | A * | 8/2000 | Velthoven | F16B 5/0657 |
| | | | | 24/297 |
| 6,520,566 | B2 * | 2/2003 | Kim | B62D 21/15 |
| | | | | 296/72 |
| 7,717,458 | B2 * | 5/2010 | Tsuge | B60R 13/02 |
| | | | | 296/193.06 |
| 8,276,861 | B2 * | 10/2012 | Ogino | F16B 5/0635 |
| | | | | 296/72 |
| 8,297,646 | B2 * | 10/2012 | Aoki | B60R 13/0206 |
| | | | | 280/730.2 |
| 8,961,092 | B2 * | 2/2015 | De Jong | B60R 13/0206 |
| | | | | 24/295 |
| 2002/0014788 | A1 * | 2/2002 | Fujita | B60K 37/00 |
| | | | | 296/72 |
| 2002/0024206 | A1 * | 2/2002 | Nagasawa | B60R 21/215 |
| | | | | 280/730.2 |
| 2008/0028577 | A1 | 2/2008 | Soman et al. | |
| 2016/0176352 | A1 * | 6/2016 | Kosuge | B60R 13/0206 |
| | | | | 296/37.12 |
| 2017/0232820 | A1 * | 8/2017 | Mitch | B60H 1/28 |
| | | | | 454/147 |

OTHER PUBLICATIONS

Written Opinion with English translation corresponding to International Application No. PCT/FR2020/051600, dated Dec. 8, 2020, 10 pages.

* cited by examiner

ASSEMBLY PART FOR CONNECTING A DASHBOARD TO A BODY PART OF A VEHICLE

TECHNICAL FIELD

This disclosure relates to an assembly part for connecting a dashboard to a body part of a vehicle.

PRIOR ART

Parts are known which make it possible to assemble two constituent elements of a vehicle, for example such as assembly parts for connecting a dashboard to the body of a vehicle. However, existing solutions do not allow a precise adjustment between the parts, which results in play between the parts after mounting. Play after mounting is particularly undesirable, due to the vibrations and noise it generates. In addition, existing assembly parts do not allow easily assembling the elements together and easily disassembling them once mounted in the vehicle.

SUMMARY

This disclosure improves the situation.

An assembly part is proposed for connecting a dashboard to a body part of a vehicle, the assembly part comprising:
 a male first portion able to engage with the dashboard, and
 a female second portion able to engage with the body part of the vehicle via an approaching movement between said female portion and said body part, said approaching movement being unidirectional and adjustable,
 the male portion being substantially flat and extending in a longitudinal direction from a first end in contact with the female portion to a hook-shaped free second end, the male portion and/or the female portion being configured to prevent translational movement between the dashboard and the body part when the male portion is engaged with the dashboard and the female portion is engaged with the body part.

The connection between the female portion and the body part is thus adjustable only in the direction of the approaching movement. It is also not possible to separate the assembly part and the body part from each other. This makes it possible to minimize play in the connection between the dashboard and the vehicle body and vibrations of the dashboard when the vehicle is in motion.

The assembly part may further comprise two side walls arranged one on either side of the male portion to prevent translational movement between the assembly part and the dashboard, and the male portion comprises two side edges each joining the first end of the male portion to the second end of the male portion, each of the edges comprising a protuberance, and the side walls each comprise an opening respectively cooperating with a protuberance of the male portion in order to limit movement of the second end of the male portion relative to the side walls.

The second end of the male portion may further be movable substantially perpendicularly to a central plane of said male portion.

Furthermore, the side walls may be arranged in a plane perpendicular to the male portion and each extend from the female portion to a free end of the side wall, and the second end of the male portion and the free end of the side wall may form facing stop surfaces defining a space able to receive part of the dashboard in order to obstruct translational movement of the dashboard in the longitudinal direction relative to the assembly part.

The female portion may also comprise a base and two arms substantially perpendicular to the base, the arms and the base defining a space for receiving the body part. In addition, at least one of the two arms may comprise a toothed area able to cooperate with a toothed area of the body part in order to prevent translational movement between the assembly part and the body part in the opposite direction to the approaching movement.

Furthermore, one of the two arms may comprise a support part intended rest against the body part.

Additionally or alternatively, the assembly part may comprise an elastic stop for maintaining the male portion in engagement with the dashboard, the elastic stop being arranged on the male portion or on the dashboard and establishing contact with the dashboard or male portion respectively.

The disclosure also relates to an assembly comprising a body part of a vehicle and an assembly part as described above.

The disclosure further relates to a vehicle comprising an assembly part as described above, a dashboard, and a body part, the assembly part connecting the dashboard to the body part.

BRIEF DESCRIPTION OF DRAWINGS

Other features, details, and advantages will become apparent upon reading the detailed description below and analyzing the appended drawings, in which.

DESCRIPTION OF EMBODIMENTS

Figure 1:
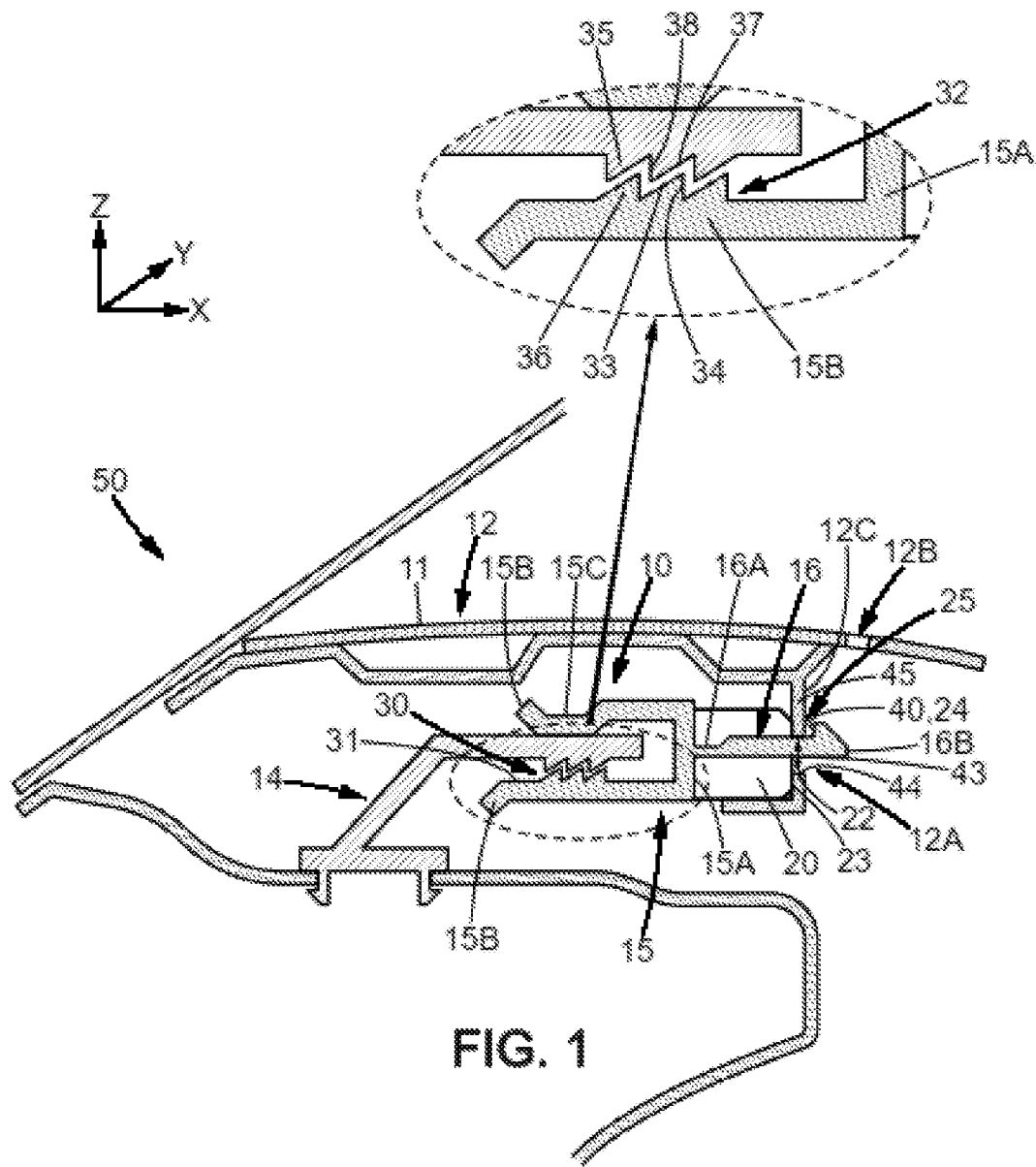
FIG. 1 shows a sectional view of an assembly consisting of the dashboard and the body part assembled together by the assembly part according to one embodiment.

FIG. 1 illustrates the assembly part 10. The assembly part 10 connects the dashboard 12 to a body part 14. As illustrated in perspective in FIG. 2, the assembly part 10 comprises a male portion 16 and a female portion 15. For the assembly of the dashboard 12 to the body part 14, the assembly part 10 is first clipped onto the dashboard 12, then the assembly formed by the assembly part 10 and the dashboard 12 is fixed to the body part 14. More specifically, the assembly part 10 is clipped onto the dashboard 12 by the male portion 16 and the assembly formed by the assembly part 10 and the dashboard 12 is fixed to the body part 14 by the female portion 15. The body part 14 may be the body itself or an attached part fixed to the body, for example welded or clipped onto the body.

Figure 2:
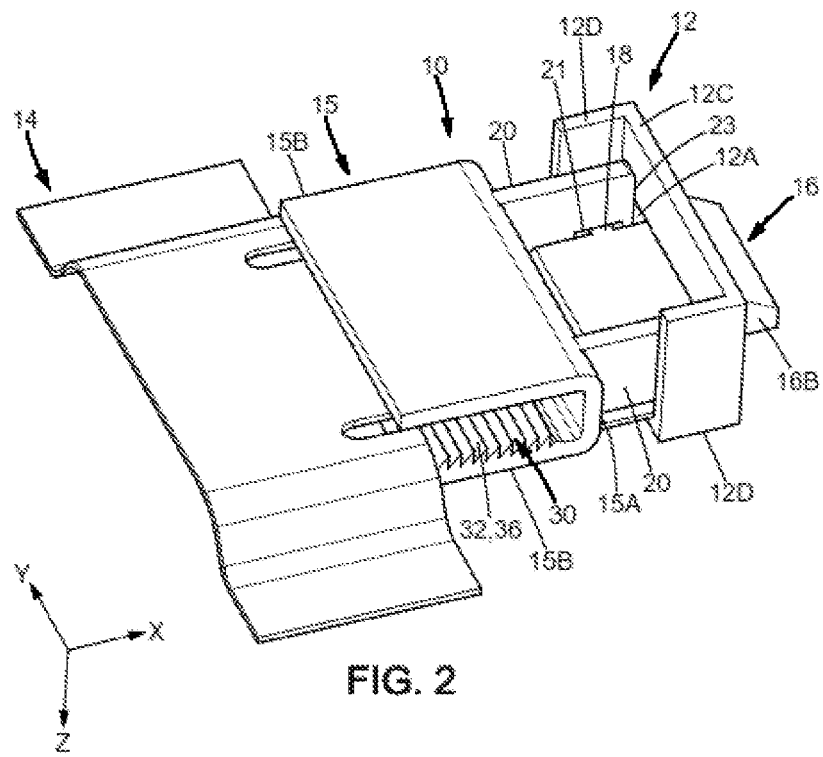
FIG. 2 shows a perspective view of the assembly according to another embodiment.
Figure 3:
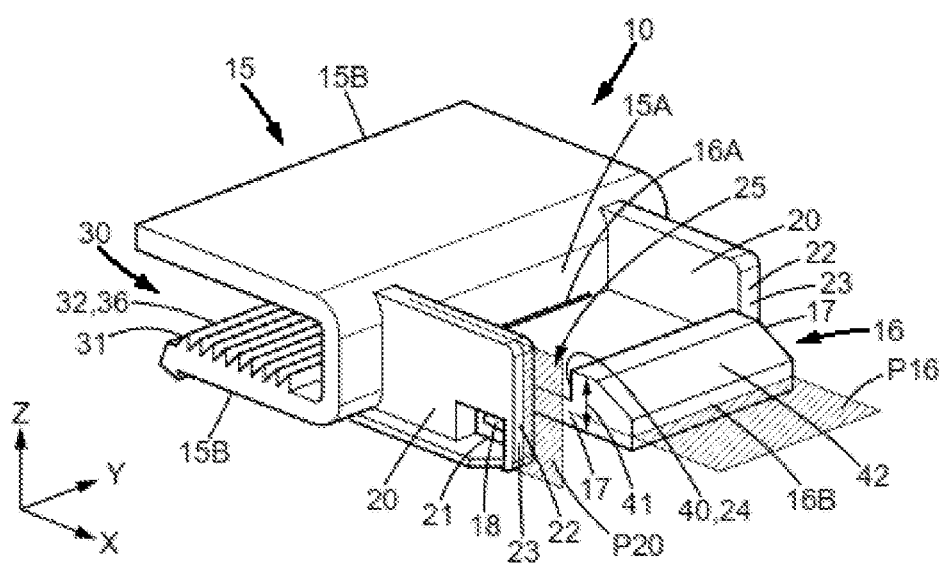
FIG. 3 shows a view from another perspective of the assembly part of FIG. 2.

In the description below, the reference system illustrated in FIGS. 1-3 represents the vertical direction Z, the longitudinal direction X, and the transverse direction Y. The elements below are described with reference to these directions X, Y, and Z, when the dashboard 12 is assembled to the body part 14 via the assembly part 10, meaning under normal conditions of use of the vehicle 50 equipped with the dashboard 12.

The dashboard 12 comprises an outer surface 11, accessible to a user under normal conditions. In practice, the elements beneath the outer surface 11 are not accessible to a user of the vehicle 50 under normal conditions. Beneath the outer surface 11, the dashboard 12 comprises in particular a vertical part 12C and two side parts 12D. The vertical part 12C is rectangular and extends primarily in the transverse direction Y. The vertical part 12C comprises a first opening 12A. The first opening 12A extends mainly in the transverse direction Y. In addition, the first opening 12A is rectangular. The first opening 12A is delimited vertically, in height, by an upper edge 45 and a lower edge 44. The distance between the upper edge 45 and the lower edge 44 defines a height 43. Furthermore, as illustrated in FIG. 2, the dashboard 12 may comprise, one on either side of the vertical part 12C, a side part 12D. The dashboard 12 thus comprises two side parts 12D which extend primarily in the longitudinal direction X, meaning perpendicularly to the vertical part 12C. The side parts 12D are substantially rectangular. The assembly formed by the vertical part 12C and the side parts 12D forms a "U".

In addition, the dashboard 12 comprises a second opening 12B. The second opening 12B is accessible from the passenger compartment of the vehicle 50 when the dashboard 12 is fixed to the body for normal use of the vehicle 50. For example, the second opening 12B corresponds to a hole in a defogger grill.

The female portion 15 is in the form of a "U", and comprises a base 15A and two arms 15B perpendicular to the base 15A. The base 15A extends primarily in the transverse direction Y while the arms 15B extend primarily in the longitudinal direction X. In the transverse direction Y, one of the arms 15B is located above the other arm 15B. The arms 15B can therefore be described as the "upper arm" and "lower arm". The arms 15B and the base 15A define a space 30 receiving the body part 14. More specifically, the arms 15B comprise an inner surface 31 on the side towards the space 30, i.e. facing the space 30. The inner surface 31 comprises an attachment area 32 for engaging the body part 14. Alternatively, each of the two or only one of the two inner surfaces 31 comprises an attachment area 32. For example, as illustrated in FIG. 1, the attachment area 32 is located on the inner surface of the lower arm 15B. The attachment area 32 may, for example, constitute a toothed area 32, which for example comprises sawteeth 36, and hook onto the body part 14. In the example illustrated in FIG. 3, the toothed area 32 is arranged within the space 30. The body part 14 may comprise a shape, with sawteeth 35, that is complementary to that of the attachment area 32. The attachment area 32 makes it possible to retain the dashboard 12 on the body 14, blocking the translational movements along the X axis that could occur between the dashboard 12 and the body 14. As can be seen in the detail view in FIG. 1, each sawtooth 36 of the attachment area 32 consists of an oblique portion 33 and a straight portion 34. The oblique portion 33 increases along the longitudinal direction X. The straight portion 34 extends parallel to the vertical direction Z. The complementary sawtooth shape 35 of the body part 14 comprises teeth whose oblique portions 37 and straight portions 38 are complementary to those of the attachment area 32 of the female portion 15. In particular, the oblique portion 37 of the sawteeth 35 of the body part 14 increases along the longitudinal direction X. The straight portion 38 of the sawteeth 35 of the body part 14 extends parallel to the vertical direction Z. The shape of the sawteeth of the attachment area 32 and of the body part 14 makes it possible to block positively oriented movement in the longitudinal direction X. On the other hand, negatively oriented movement in the longitudinal direction X remains possible, in particular allowing the assembly part 10 to slide (negatively oriented movement in the longitudinal direction X) on the body part 14 during assembly of the dashboard 12 to the vehicle body. The sawtooth shape presented here is particularly advantageous because it allows better adjustment of the distance between the hook 16B of the male portion 16, detailed below, and restriction of the play between the assembly part 10 and body part 14 after assembly. Once the body part 14 and the dashboard 12 are assembled via the assembly part 10, disassembly (i.e. positively oriented movement of the assembly part 10 in the longitudinal direction X) is not possible unless a disassembly tool is used which is described below.

Alternatively, as illustrated in FIG. 1, arm 15B comprises a support part 15C. This support part 15C is intended to rest against the body part 14. The support part 15C is located between the free end of the upper arm 15B and the base 15A, for example towards the middle of arm 15B in the longitudinal direction X. The support part 15C ensures constant support of the female portion 15 on the body part 14, in order to prevent the teeth of the female portion 15 and body part 14 from breaking off and weakening the connection between these two parts 14, 15. Furthermore, the support part 15C causes a reduction in the height of the space 30 in the vertical direction Y. In other words, the space 30 of the female portion 15 is larger at its opening formed by its free end, to facilitate insertion of the body part 14 into the female portion 15, and then narrows in the region of the support part 15C.

The male portion 16 is substantially flat. The male portion 16 extends in the longitudinal direction X. In particular, the male portion 16 extends from a first end 16A to a second end 16B. The first end 16A is in contact with the female portion 15. More precisely, the first end 16A is in contact with the base 15A of the female portion 15. In addition, the first end 16A extends in the same transverse direction Y as the base 15A. The second end 16B is free. Furthermore, the second end 16B is in the shape of a hook.

A central plane P16 is also defined, visible in FIG. 3. This central plane P16 is the plane which extends between the first end 16A and the second end 16B of the male portion 16, in the longitudinal X and transverse Y directions. In addition, the central plane P16 divides the male portion 16 into two substantially equal parts in the vertical direction Z. The central plane P16 can thus be qualified as mid-plane. The central plane P16 further corresponds to a plane defined when the male portion 16 is stationary. In other words, although the male portion 16 is movable relative to the constituent elements of the assembly part 10, the central plane P16 remains fixed relative to the movement of the male portion 16.

Advantageously, the male portion 16 is elastically deformable. "Elastically deformable" is understood to mean that the male portion 16 is sufficiently rigid to retain its own shape without the contribution of any support, and sufficiently flexible to bend under the action of a force applied for example on the second end 16B.

When the dashboard 12 is assembled to the body part 14, the second end 16B is housed in the first opening 12A of the dashboard 12. The second end 16B is in the form of a hook, which allows positively oriented movement of the second end 16B within the opening 12A in the longitudinal direction X but which prevents negatively oriented movement in the longitudinal direction X. More precisely, as illustrated in FIG. 3, the second end 16B comprises a vertical surface 40 and an inclined surface 42. The vertical surface 40 extends parallel to the vertical direction Z and is located facing the base 15A of the female portion 15. The inclined surface 42 decreases along the longitudinal direction X, from the vertical surface 40. The second end 16B has a height 41 measured in the vertical direction Z that is slightly less than the height 43 of the opening 12A, also measured in the vertical direction Z. In particular, when the dashboard 12 is assembled to the body part 14, the second end 16B rests on the upper edge 45 of the first opening 12A, and the vertical surface 40 of the second end 16B constitutes a stop surface 24 which the dashboard 12 abuts against, blocking negatively oriented movement of the second end 16B within the first opening 12A in the longitudinal direction X.

In order to detach the dashboard 12 from the body (and from the assembly part 10 fixed to the body part 14), it is possible to insert a long and thin tool, such as a screwdriver for example, through the second opening 12B in order to press on the second end 16B. As the male portion 16 is elastically deformable, the force exerted on the second end 16B by the tool causes the male portion 16 to tilt downwards in the vertical direction Z. The height 41 of the second part 16 being less than the height 43 of the first opening 12A, the second end 16B can pass through the first opening 12A (in other words travel in a negatively oriented movement in the longitudinal direction X), which unlocks the assembly part 10 from the dashboard 12.

Alternatively, the assembly part comprises two side walls 20, illustrated for example in FIGS. 1 to 3. The side walls 20 are arranged one on either side of the male portion 16. More specifically, the side walls 20 are arranged in a plane P20 perpendicular to the male portion 16, and each extends from the female portion 15 to a side wall free end 22. Each side wall 20 comprises a passage 21. The passage 21 is able to receive a protuberance 18 of the male portion 16. The side walls 20 prevent translational movements between the assembly part 10 and the dashboard 12 and therefore indirectly prevent translational movements between the dashboard 12 and the body part 14. In particular, the side walls 20 block translational movement in the transverse direction Y and positively oriented translational movement in the longitudinal direction X. More specifically, the side walls 20 extend perpendicularly to the male portion 16, from the base 15A of the female portion 15 towards the second end 16B of the male portion 16. The side walls 20 are fixed to the female portion 15, but they are not fixed to the male portion 16, which allows the male portion 16 to be movable relative to the side walls 20. More specifically, the second end 16B of the male portion 16 is movable perpendicularly to a central plane P16 of said male portion 16 relative to the side walls 20 and to the female portion 15. However, the movement of the male portion 16 relative to the side walls 20 is limited by the protuberance 18 which is engaged in the passage 21. The side walls 20 are not as long as the male portion 16. This difference in length defines a space 25 capable of receiving part of the dashboard 12, and in particular the vertical part 12C of the dashboard 12.

The dashboard 12 can thus be inserted vertically between the side walls 20 and the second end 16B of the male portion 16. The ends of the side walls 20, opposite to the ends in contact with the female portion 15, form the side wall free ends 22 and form stop surfaces 23 to block negatively oriented movement of the dashboard 12 in the longitudinal direction X. Consequently, the stop surface 24 of the male portion 16 and the stop surfaces 23 of the side walls 20 are arranged opposite each other and define the space 25 able to receive part of the dashboard 12, in order to block translational movement of the dashboard 12 in the longitudinal direction X relative to the assembly part 10.

In addition, the side parts 12D of the dashboard 12 encircle the assembly part 10. More specifically, the side parts 12D surround the side walls 20 and the male portion 16 of the assembly part 10. The translational movement in the Y direction of the assembly part 10 is thus limited by the side parts 12D of the dashboard 12. Moreover, as can be understood from FIG. 2, the side walls 20 also serve as a guide for correct insertion of the male portion 16 into the first opening 12A, being obstructed on either side by the side parts 12D.

Furthermore, the male portion 16 comprises two side edges 17 arranged laterally one on either side. Each of the two side edges 17 extends between the first end 16A and the second end 16B. Each side edge 17 faces one of the two side parts 20. In addition, each side edge 17 comprises a protuberance 18. Each protuberance 18 cooperates with the passage 21 of the side part 20 facing the corresponding side edge 17. The protuberance 18, by being housed in the passage 21, restricts vertical movement of the male portion 16 in direction Z relative to the female portion 15 when a force is applied to the second end 16B of the male portion. This prevents in particular the breakage of the male portion 16 from the rest of the assembly part 10, i.e. the male portion 16 from detaching from the female portion 15.

Figure 4:
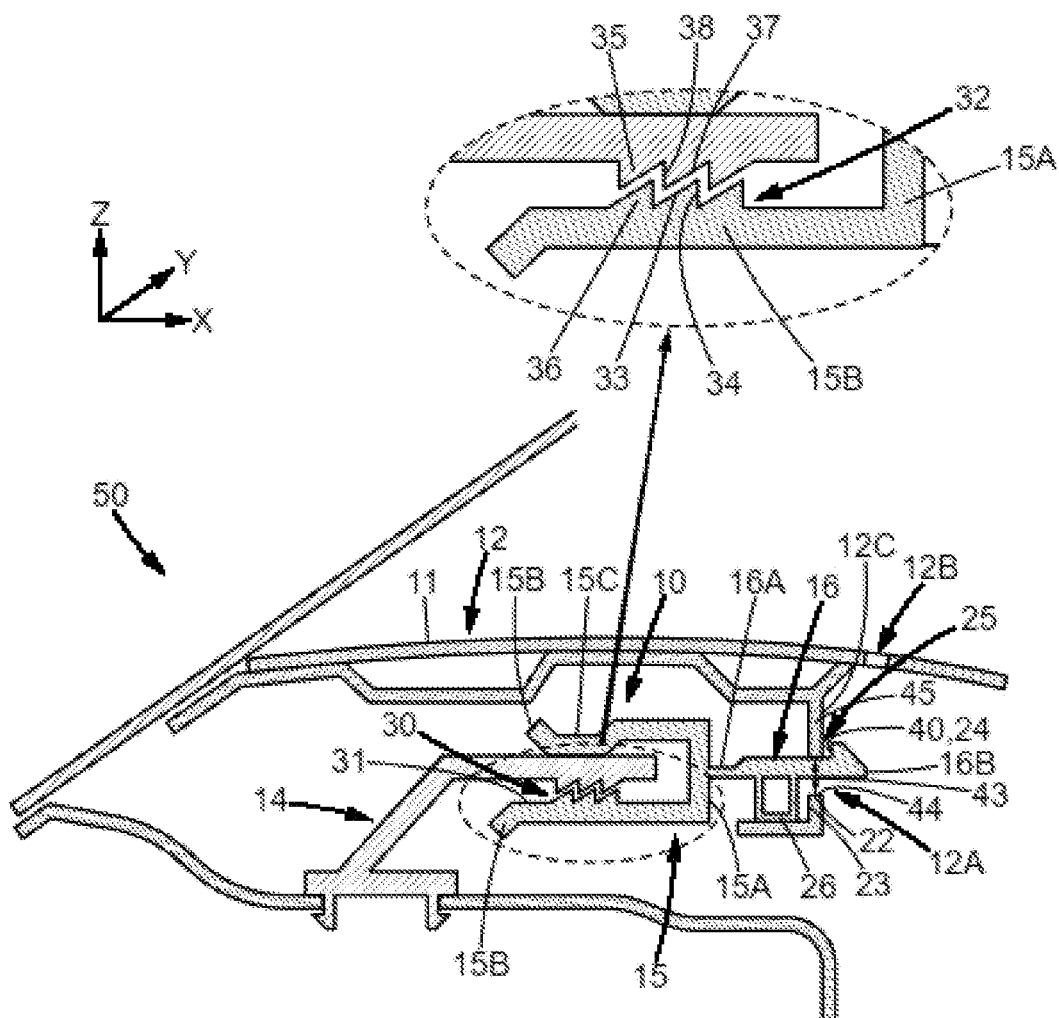
FIG. 4 shows another exemplary embodiment of the assembly in a view identical to that of FIG. 1.
Figure 5:
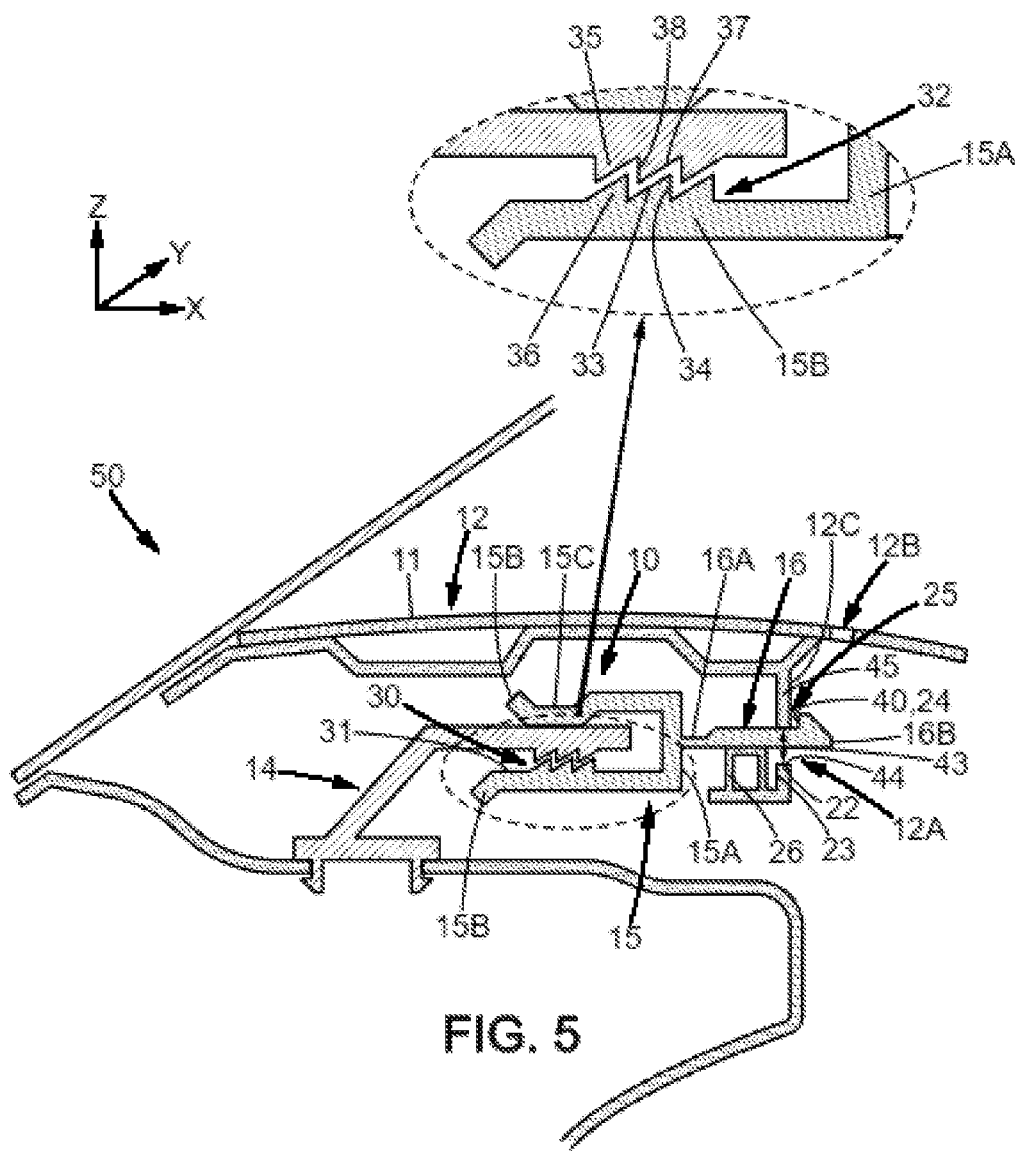
FIG. 5 shows another exemplary embodiment of the assembly in a view identical to that of FIG. 1 and FIG. 4.

According to another exemplary embodiment, the assembly part further comprises an elastic stop 26, illustrated in FIGS. 4 and 5. This elastic stop 26 may be integrated into the male portion (FIG. 4) or into the dashboard 12 (FIG. 5). The elastic stop 26 contributes to keeping the male portion 16 raised (in the vertical direction Y) so that it rests against the upper edge 45 of the first opening 12A of the dashboard. In particular, the elastic stop 26 brings the male portion 16 into contact with the dashboard 12.

The elastic stop 26 is for example in the form of a hollow pin, sufficiently deformable to be able to release the hook 16B from the first opening 12A and thus detach the dashboard 12 from the body.

As illustrated in FIG. 4, the elastic stop is arranged on the lower face of the male portion 16, facing a portion of the dashboard 12 arranged in the longitudinal direction. In FIG. 5, the elastic stop is conversely arranged on the portion of the dashboard 12 arranged in the longitudinal direction, facing the lower face of the male portion 16.

The invention claimed is:

1. An assembly part for connecting a dashboard to a body part of a vehicle, the assembly part comprising:
   a male first portion able to engage with the dashboard, and
   a female second portion able to engage with the body part of the vehicle via an approaching movement between said female portion and said body part, said approaching movement being unidirectional and adjustable, the male portion being substantially flat and extending in a longitudinal direction from a first end in contact with the female portion to a hook-shaped free second end,
   the male portion and/or the female portion being configured to prevent translational movement between the dashboard and the body part when the male portion is engaged with the dashboard and the female portion is engaged with the body part.

2. The assembly part of claim 1, further comprising two side walls arranged one on either side of the male portion to prevent translational movement between the assembly part and the dashboard, and wherein:

the male portion comprises two side edges each joining the first end of the male portion to the second end of the male portion, each of the edges comprising a protuberance, and the side walls each comprise an opening respectively cooperating with a protuberance of the male portion in order to limit movement of the second end of the male portion relative to the side walls.

3. The assembly part of claim 1, wherein the second end of the male portion is movable substantially perpendicularly to a central plane of said male portion.

4. The assembly part of claim 2, wherein:
the side walls are arranged in a plane perpendicular to the male portion and each extend from the female portion to a free end of the side wall, and
the second end of the male portion and the free end of the side wall form facing stop surfaces defining a space able to receive part of the dashboard in order to obstruct translational movement of the dashboard in the longitudinal direction relative to the assembly part.

5. The assembly part of claim 1, wherein the female portion comprises a base and two arms substantially perpendicular to the base, the arms and the base defining a space for receiving the body part.

6. The assembly part of claim 5, wherein at least one of the two arms comprises a toothed area able to cooperate with a toothed area of the body part in order to prevent translational movement between the assembly part and the body part in the opposite direction to the approaching movement.

7. The assembly part of claim 5, wherein one of the two arms comprises a support part intended to rest against the body part.

8. The assembly part of claim 1, further comprising an elastic stop for maintaining the male portion in engagement with the dashboard, the elastic stop being arranged on the male portion or on the dashboard and establishing contact with the dashboard or male portion respectively.

9. An assembly comprising a body part of a vehicle and the assembly part of claim 1.

10. A vehicle comprising: the assembly part of claim 1, a dashboard, and a body part, the assembly part connecting the dashboard to the body part.

11. An assembly part for connecting a dashboard to a body part of a vehicle, the assembly part comprising:
a male first portion able to engage with the dashboard, and
a female second portion able to engage with the body part of the vehicle in an approaching movement between said female portion and said body part, said approaching movement being unidirectional and adjustable, the male portion being substantially flat and extending in a longitudinal direction from a first end in contact with the female portion to a hook-shaped free second end,
the male portion and/or the female portion being configured to prevent translational movement between the dashboard and the body part when the male portion is engaged with the dashboard and the female portion is engaged with the body part,
wherein the female portion is in the form of a "U" and comprises a base and two arms perpendicular to the base, and
wherein the first end of the male portion is in contact with the base of the female portion.

12. The assembly part of claim 11, further comprising two side walls arranged one on either side of the male portion to prevent translational movement between the assembly part and the dashboard, wherein:
the male portion comprises two side edges each joining the first end of the male portion to the second end of the male portion, each of the edges comprising a protuberance, and
the side walls each comprise an opening respectively cooperating with a protuberance of the male portion in order to limit movement of the second end of the male portion relative to the side walls.

13. The assembly part of claim 11, wherein the second end of the male portion is movable substantially perpendicularly to a central plane of said male portion.

14. The assembly part of claim 12, wherein:
the side walls are arranged in a plane perpendicular to the male portion and each extend from the female portion to a free end of the side wall, and
the second end of the male portion and the free end of the side wall form facing stop surfaces defining a space able to receive part of the dashboard in order to obstruct translational movement of the dashboard in the longitudinal direction relative to the assembly part.

15. The assembly part of claim 11, wherein the arms and the base of the female portion define a space for receiving the body part.

16. The assembly part of claim 11, wherein at least one of the two arms comprises a toothed area able to cooperate with a toothed area of the body part in order to prevent translational movement between the assembly part and the body part in the opposite direction to the approaching movement.

17. The assembly part of claim 11, wherein one of the two arms comprises a support part intended to rest against the body part.

18. The assembly part of claim 11, further comprising an elastic stop for maintaining the male portion in engagement with the dashboard, the elastic stop being arranged on the male portion or on the dashboard and establishing contact with the dashboard or male portion respectively.

\* \* \* \* \*